United States Patent

Carmel et al.

[11] 3,776,569
[45] Dec. 4, 1973

[54] TRAILER LANDING GEAR ARRANGEMENT

[75] Inventors: Edwin L. Carmel; Olaf W. Schirmer, both of Cincinnati, Ohio

[73] Assignee: Pullman Incorporated, Chicago, Ill.

[22] Filed: Jan. 27, 1972

[21] Appl. No.: 221,157

[52] U.S. Cl. ............... 280/106 T, 254/86, 248/351, 280/150.5
[51] Int. Cl. ......................................... B62d 21/00
[58] Field of Search ................... 280/106 T, 150.5; 248/351, 352; 254/86

[56] References Cited
UNITED STATES PATENTS

| 3,093,362 | 6/1963 | Schaefer | 254/86 |
| 3,248,084 | 4/1966 | Hammond | 254/86 |

*Primary Examiner*—Philip Goodman
*Attorney*—Hilmond O. Vogel et al.

[57] ABSTRACT

A highway trailer having a landing gear mounted on each side to each main rail of the trailer by means of bolts which attach the landing gear mounting plate to the main rail mounting angles and a single piece mounting brace that is attached to the landing gear tab by bolts, and the top edge of the single piece mounting brace is welded to the lower flange of the main rail and to the lower flange of the landing gear crossmember, the single piece mounting brace being trapezoidal shaped and bent at 90° about its vertical center line to provide for two diaphragm plate portions, one for each direction of force, as well as providing opposing stiffeners which strengthen the opposite plane.

7 Claims, 4 Drawing Figures

PATENTED DEC 4 1973                              3,776,569

TRAILER LANDING GEAR ARRANGEMENT

BACKGROUND OF THE INVENTION

1. Field of the Invention

This invention relates to landing gears or props on semi-trailers and the invention is more particularly related to means for bracing the landing gear.

2. Description of the Prior Art

Presently, landing gears or props on semi-trailers are mounted with an individual brace for each direction of opposed force and it is desirable to use a common unitary bracing means, which this invention has as its goal.

SUMMARY

It is a general object of this invention to provide for a single brace for the landing gear of a semi-trailer to resist multi-directional forces.

It is further an object of this invention to provide such landing gear mounting brace which is a single piece or unit, such single piece landing gear resisting fore and aft and vertical forces during coupling and uncoupling of the semi-trailer to a tractor and wherein the mounting of the brace also resists sideways forces imposed during coupling maneuvers and during on-off loading operations encountered during railroad piggyback service, as well as other abusive operations.

A further object of this invention is to provide a single piece brace that is 90° about its vertical center line to provide two perpendicular planes acting as resisting diaphragms for each direction of force, as well as opposing stiffeners which strengthen the opposite plane.

These and other objects, purposes and advantages will become apparent from reference to the following description, appended claims and attached drawings.

DESCRIPTION OF THE PREFERRED EMBODIMENT

Figure 1:
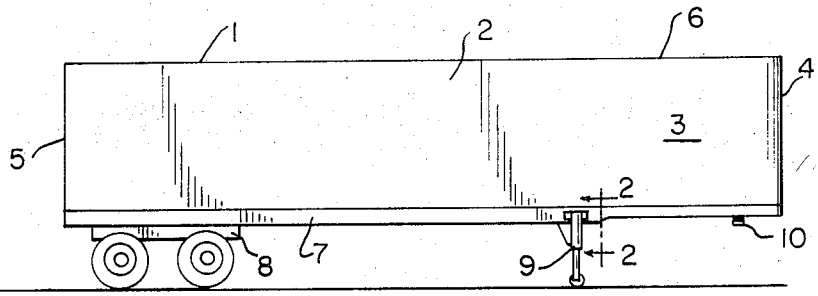
FIG. 1 is an elevational view of a semi-trailer.
Figure 3:
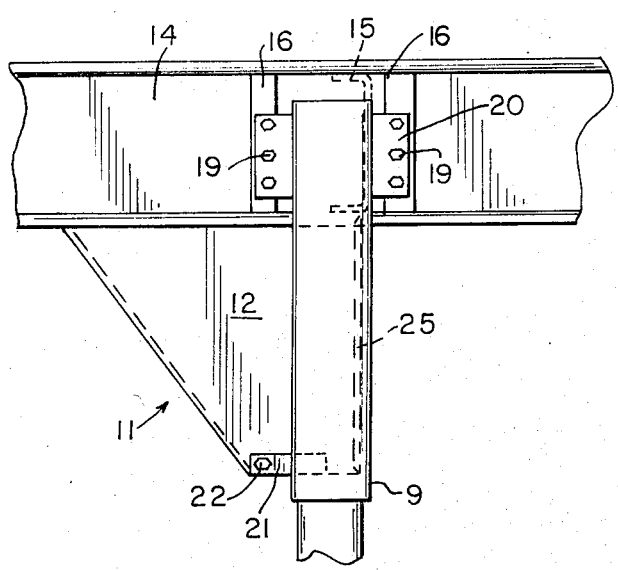
FIG. 3 is an enlarged elevational view illustrating the novel single piece brace.
Figure 2:
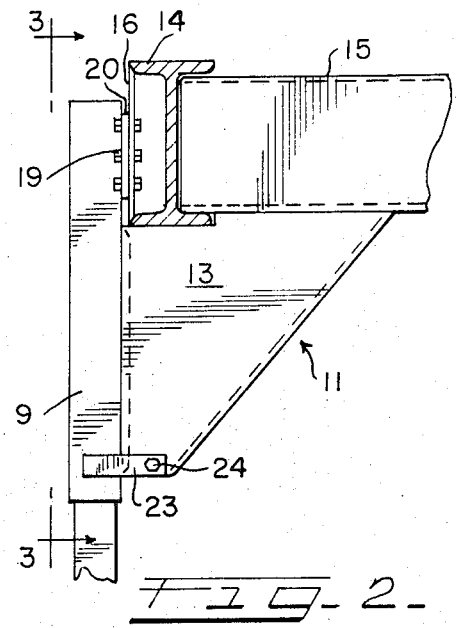
FIG. 2 is a sectional view taken along line 2—2 of FIG. 1.

With reference now to the drawings, there is shown a semi-trailer 1 having a top 2, side 3, front 4 and rear 5. The trailer comprises a trailer body 6 which is supported on a chassis or underframe 7 supported by a bogie unit 8 at the rear end and a landing gear 9 toward the front end, and forward of this is located the trailer kingpin 10 depending from the trailer chassis.

In the extended position, as shown in the drawing, the landing gear is supported by a single piece brace 11. The brace 11 is a trapezoidal shaped steel member bent at 90° about its vertical center line to define a generally triangular shaped longitudinally extending brace element 12 and a transversely extending brace element 13. The single piece or unitary brace 11 located on each side at the forward portion of the trailer is attached to a respective main or side rail 14 at the juncture of a crossmember 15 of the underframe 7. The main rail is an I-shaped beam and the cross member is a channel shaped member. The main rail 14 is provided with a pair of upright angle members 16 on the outside portion of the main rail I-beam on each side of a crossmember 15, as best seen in the exploded view 4. Each main rail mounting angle member is provided with apertures 17 for registering with openings 18 in receiving bolts 19 therethrough for attaching longitudinal landing gear mounting plate 20 which is welded to the landing gear 9. The lower part of the landing gear is provided with a longitudinally extending tab member 21 provided with bolt means 22 for attaching the tab to the lower portion of the longitudinal brace element 12. A further landing gear tab 23 that is attached to the landing gear 9 also is attached to the lower end of the cross brace element 13 of the brace member 11 by bolt means 24.

Figure 4:
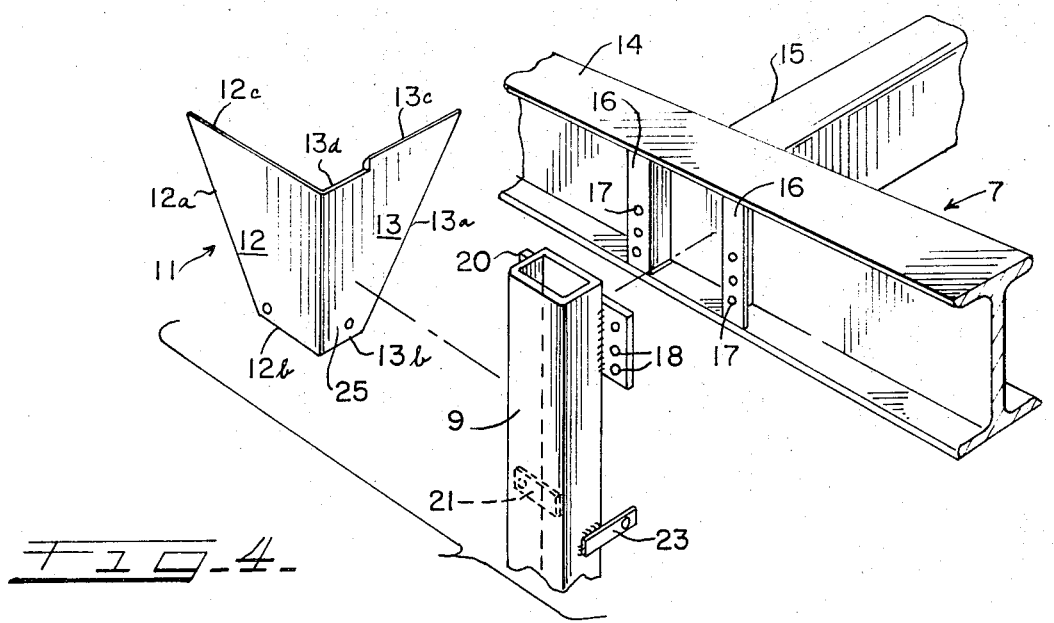
FIG. 4 is a perspective exploded view similar to that of FIG. 3.

As best seen in FIG. 4, the longitudinal portion of the single piece brace member is provided with a sloped side 12a, a bottom horizontal side 12b and a top edge 12c and a forward edge or corner 25 which it shares with the cross brace portion 13. This cross brace portion 13 is provided with a sloped inner or lateral edge portion 13a and a bottom portion 13b and an inner top edge 13c and a cutout edge portion 13d which receives the bottom flange of the I-beam or main rail member 14.

Such a single piece landing gear mounting brace resists fore and aft and vertical forces and sideways forces. Though this invention is illustrated for container chassis, it is also adapted for other types of semi-trailers.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a semi-trailer having an underframe having a landing gear extending therefrom,
bracing and attaching means for connecting the trailer landing gear to the underframe comprising:
a unitary brace structure being of a generally trapezoidal shape and bent at substantially 90° angles generally about its vertical center line to provide for two generally perpendicularly opposed brace portions, the first brace portion extending longitudinally and the second brace portion extending transversely of the trailer,
said underframe having a longitudinal main rail and a transverse crossmember,
said first brace portion having means attaching the brace to the landing gear and being attached to the main rail of the trailer underframe,
said second brace portion having means attaching it to the trailer landing gear and being attached to the underframe main rail and to the underframe crossmember,
said main rail being provided with longitudinally spaced upright members and plate means attached on said members and connecting with said landing gear for attachment of the landing gear to the main rail.

2. In a semi-trailer having an underframe having a landing gear,
bracing and attaching means for connecting the trailer landing gear to the underframe comprising:
a unitary brace structure bent at a substantially 90° angle generally about its vertical center line to provide for two transversely opposed brace portions, the first brace portion extending longitudinally and the second brace portion extending transversely of the trailer, said first brace portion having means attaching the brace to the landing gear and being attached to the side of the trailer underframe, said second brace portion having means attaching it to the trailer landing gear and being attached to the side and to the underside crosswise.

3. The invention according to claim 2, and said brace structure being of a generally trapezoidal shape bent at a substantially 90° angle about its vertical center line to provide for two generally perpendicularly opposed brace portions.

4. The invention according to claim 2, and said unitary brace structure being bent generally at a 90° angle to provide for generally perpendicularly opposed brace portions.

5. The invention according to claim 2, and said trailer underframe side including a main rail and said underframe underside including a crossmember, said first brace portion being attached to the main rail and the landing gear and said second brace portion being attached to the cross-member and the landing gear.

6. The invention according to claim 2, and said means attaching for each of the brace portions including a tab connecting the lower portion of said respective brace portion to the landing gear.

7. The invention according to claim 2, and said side of the underframe including a longitudinally extending horizontally extending main rail being provided with longitudinally spaced upright members and plate means attached on the member and connecting with the landing gear for attachment of the landing gear to the main rail.

* * * * *